United States Patent
Beisner et al.

[11] Patent Number: 6,020,846
[45] Date of Patent: Feb. 1, 2000

[54] GLOBAL POSITIONING SYSTEM EMPLOYING CLOCKS ONLY MODEL

[75] Inventors: Henry M. Beisner, Rockville; Robert Harold Benner, Gaithersburg, both of Md.; Jack George Rudd, Boulder, Colo.

[73] Assignee: Lockheed Martin Corporation, Bethesda, Md.

[21] Appl. No.: 09/220,680

[22] Filed: Dec. 23, 1998

[51] Int. Cl.$^7$ .............................. H04B 7/185; G01S 5/02
[52] U.S. Cl. ............................... 342/357.02; 342/357.06; 701/214
[58] Field of Search .............................. 342/357, 357.02, 342/357.06; 701/213, 214

[56] References Cited

U.S. PATENT DOCUMENTS 5,623,414  4/1997  Misra ........................................ 342/357

*Primary Examiner*—Theodore M. Blum
*Attorney, Agent, or Firm*—Lane, Aitken & McCann

[57] ABSTRACT

In a global monitoring system having four or more satellites which transmit messages to user stations by which the user stations can determine the user position, the satellite messages include the time of transmission of the messages as indicated by satellite clocks and includes a correction message. The correction message consists of time correction values for the satellite clocks. The satellite time correction values are determined from a clocks only model wherein three or more monitoring stations having known positions on the ground receive the satellite messages and determine pseudoranges between the satellites and the monitoring stations. The satellite time correction values are determined statistically by nonlinear least squares from a clocks only model relating the ranges between the satellites and the monitoring stations to the measured pseudoranges, the satellite time correction values and monitoring stations time correction values.

9 Claims, 1 Drawing Sheet

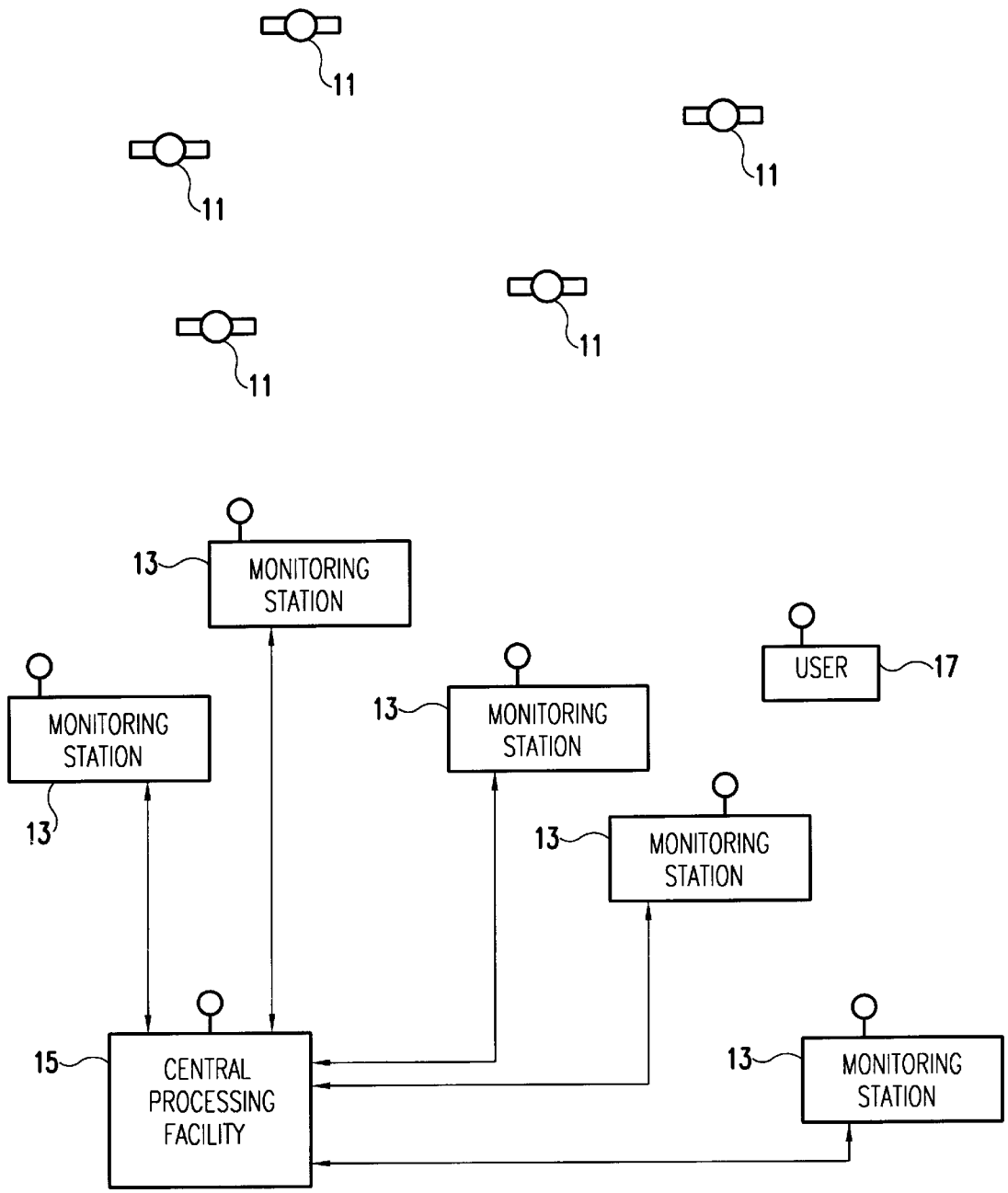

GLOBAL POSITIONING SYSTEM EMPLOYING CLOCKS ONLY MODEL

This invention relates to an improved Global Positioning System employing satellites and monitoring stations to accurately determine the position of a user.

In a global positioning system or global navigation satellite system, the user of the system receives signal messages from satellites, which messages each contain satellite position and time information indicating that the time that the message was transmitted as indicated by the satellite clock. The user also has a clock at his user station. The user determines the time of travel of the satellite signal message to his position by comparing the time the message was transmitted with time of reception as determined by the user clock. If the satellite clock were precisely accurate and the user clock were precisely accurate and there were no other distortions, the range between the satellite and the user could be precisely determined by the time of travel of the message from the satellite to the user times the speed of light. In practice, the clocks including the satellite clock as well as the satellite position are not precisely known. In addition, the time of travel is distorted by troposphere and ionosphere. To overcome these sources of error in estimating the position of the user, correction messages are transmitted to the user to enable the user to make corrections, thereby enabling the user to more accurately estimate his position.

The present invention provides a simpler technique of determining the correction message which when employed by the user to calculate his position provides a remarkably accurate estimation of the user position.

SUMMARY OF THE INVENTION

In accordance with the present invention, at least four satellites and preferably five satellites, of which the orbits and positions are known with reasonable accuracy, are provided. In addition, a plurality of monitoring stations are provided on the ground, and preferably five monitoring stations, are provided and the positions of these monitoring stations are also known with reasonable accuracy. In accordance with the invention, a correction message is calculated in the form of only time correction values which are transmitted to the user. The time corrections are calculated in a way so that they incorporate corrections for the satellite clock biases and other errors in the system including satellite position errors, errors due to the troposphere, ionosphere, and satellite accessability errors. To calculate the time correction values, a clocks only model for the system is assumed and the time correction values are determined from the estimated satellite positions, estimated monitoring station positions and pseudo range measurements made by the monitoring stations. Pseudorange range measurements are the measured ranges between the monitoring stations and the monitoring stations based solely on the time of transmission and the time of receipt of the time messages and ignoring all of the system errors. From the available data, time correction values for satellite clocks and the monitoring station clocks are determined using a statistical method, such as nonlinear least squares. As a result of this technique of determining time correction values, clock biases and errors due to the troposphere and ionosphere and satellite orbit, as well as monitoring station position and satellite accessability errors, are accounted for in the determined time correction values. As a result, when the correction message including the time correction values for the satellite clocks are transmitted to the user station, the user in calculating the user position making use of the correction message to correct the transmitted time messages from the satellite achieves a position measurement which is remarkably accurate.

BRIEF DESCRIPTION OF THE DRAWINGS

The single FIGURE of the invention schematically illustrates the system in which the invention is employed.

DESCRIPTION OF PREFERRED EMBODIMENTS

The global positioning system incorporating the invention employs at least four satellites and preferably employs at least five satellites 11 as shown in the drawing. The system also employs at least three monitoring stations at known geographic locations and preferably employs at least five ground stations 13 at known geographical locations on the ground. The monitoring stations are connected to two-way communication with a central processing facility 15 which may be at one of the monitoring stations. The satellite orbits are known with reasonable precision and, accordingly, the range between each of the satellites and each of the monitoring stations at any given instant of time is known with reasonable accuracy. The satellites 11 periodically transmit messages giving the time of transmission as indicated by the corresponding satellite clock and these messages are received by the monitoring stations 13. The satellite messages may also be received by user stations, one of which is represented by the user station 15 in FIG. 1. If the satellite clocks were precisely accurate and the satellite positions were known exactly and there were no distortions due to ionosphere and troposphere or other errors in the system, the user would be able to determine the position of the user station from the satellite messages assuming that the user station clock was also precisely accurate. The range R between the satellite and a user station is represented by R=CT wherein C is the speed of light and T is the time for the message to travel from the satellite to the user station. From at least three known ranges and three known positions of the satellites at the time the messages were transmitted, the user position could be precisely determined by triangulation. In order to measure the range to the satellite, the user needs to know the time as indicated by the satellite clocks. The user determines the time as an additional unknown by measuring the range to the fourth satellite. As a practical matter, there are errors in the satellite clocks and there also errors in the satellite positions. In addition, there are ionosphere and troposphere distortion errors in the time for a signal to travel between a satellite and a monitoring station. In order to account for these errors, the satellites transmit a correction message with each transmitted message giving the time of transmission. This correction message provides the satellite clock biases to the user as well as other corrections so that the user can more accurately calculate his position.

The system of the present invention provides simpler, yet highly accurate method of providing correction information to the user whereby the user can accurately calculate his position as is described below.

Let y be a vector of $N_y$ measurements, e.g., pseudorange measurements. Let x be a vector of $N_x$ "true" system states, e.g., satellite vehicle orbits, clock biases, station and user locations and clock biases, etc. Let $\tilde{y}$ be a vector of $N_y$ "true" measurement states. Then, $$\tilde{y} = f(x) \qquad (1)$$

where f(x) is a nonlinear equation relating the true measurement states to the true system states. Then, $$y + \tilde{y} + \eta \quad (2)$$

where y is a vector of $N_y$ measurements and $\eta$ is a vector of $N_y$ independent measurement errors.

Let $\hat{x}$ be a vector of $N_x$ estimates of the system states. Let $\hat{y}$ vector of $N_y$ estimates of the measurement states where:

Let $y-\hat{y}$ be a vector of $N_y$ measurement residuals. Then the differential correction equation for the residual is:

$$y - \hat{y} = F\Delta\hat{x} \quad (4)$$

where F is an $N_y$ by $N_x$ partial derivative matrix and $\Delta\hat{x}$ is a vector of corrections to the estimated states $\hat{x}$. In this manner, the relation between x and y is linearized about a reference. When the mean square of these residuals is minimized over $\hat{x}$, an exact expression results for the mean square measurement residual:

$$\left(1 - \frac{N_x}{N_y}\right)\overline{\eta^2} \quad (5)$$

where $\overline{n}$ is the mean square measurement error. The vector $\hat{y} - \tilde{y}$ consists of $N_y$ errors of the estimated measurement states based on the "true" measurement states. An exact expression for the mean square error of an estimated measurement state is $$\frac{N_x}{N_y}\overline{\eta^2} \quad (6)$$

These expressions are independent of the form of F.

If the number of states $N_x$ equals the number of measurements $N_y$, the residuals are reduced to zero. This is not surprising because $N_x$ equations in $N_x$ unknowns can be solved exactly. However, when this is the case, the mean square error of the estimated measurement state is maximized.

In fact, the number of "true" system states is much larger than the number of measurements. In a practical system, an approximation must be made wherein a model is postulated with a number of system states which is equal to or less than the number of measurements.

The error of the estimated measurement state, i.e., pseudorange, for a station is directly related to a nearby user's range error. Accordingly, based on the above expression, it should be desired to minimize $N_x$, the number of system states. This action also reduces, i.e., compresses, the amount of correction data that needs to be sent to the user. Unfortunately, there is a price to pay. When the number of system states $N_x$ is reduced, modeling error is increased. The following exposition will demonstrate this fact.

Let x' be a vector of $N'_x$ "true" (modeled) system states. Let $\tilde{y}'$ be a vector of $N_y$ "true" (modeled) measurement states for which $$\tilde{y}' = f(x') \quad (7)$$

The measurement vector is, now, $$y = \tilde{y}' + \eta' \quad (8)$$

where the new measurement error vector includes modeling error and is expressed $$\eta' = \eta + \mu \quad (9)$$

where the modeling error vector is $$\mu = f(x) - f(x') \quad (10)$$

One defines the "true" (modeled) system vector x' such that it minimizes the expected squared magnitude of the modeling error, i.e., $\mu$.

Let $\hat{x}'$ be a vector of $N'_x$ estimates of the modeled system states. Let $\hat{y}'$ be a vector of $N_y$ estimates of modeled measurement states where $\hat{y}' = f(\hat{x}')$. The differential correction equation for the modeled measurement residual $y - \hat{y}'$ can be expressed as $$y - \hat{y}' = F'\Delta\hat{x} \quad (11)$$

in which F' is $N'_x$ by $N_y$ partial derivative matrix, $\Delta\hat{x}$ is a vector of a corrections to the modeled measurement states.

By derivation similar to the above derivation for $y - \hat{y}$, the mean square modeled measurement residual $y - \hat{y}'$ can be written as:

$$\left(1 - \frac{N'_x}{N_x}\right)\left(\overline{n^2} + \overline{u^2}\right) \quad (12)$$

Also, the mean square modeled measurement state estimation error, $\hat{y}' - \tilde{y}'$ can be written as:

$$\frac{N_x}{N_y}\left(\overline{\eta^2} + \overline{\mu^2}\right) \quad (13)$$

Now, when the modeled measurement, i.e., pseudorange, state estimation error is minimized by decreasing the number of modeled system states $N'_x$ the modeling error, $\mu$, is unavoidably increased. In a workable system, a compromise must be made. The best model with the fewest states which minimize the pseudorange state estimation error and keeps the user correction data to a minimum must be found.

In accordance with the invention, this design problem is solved by using a clocks only model. In this model, the range between a satellite and a monitoring station can be expressed as follows:

$$R = C[(T_m + \Delta T_m) - (T_s + \Delta T_s)] \quad (14)$$
$$= C(T_m - T_s) + C(\Delta T_m - \Delta T_s)$$

wherein R is the range between the satellite and the monitoring station, C is the speed of light, $T_s$ is the time of a message transmitted from the satellite as indicated by the satellite clock, $\Delta T_s$ is a time correction value for $T_s$, $T_m$ is the time of receipt of the message from the satellite by a monitoring station and $\Delta T_m$ is a time correction value for $T_m$. The quantity $C(T_m - T_s)$ is the pseudorange between the satellite vehicle and the monitoring station. Thus, Equation (14) can be rewritten as follows:

$$R = P - C(\Delta T_m - \Delta T_s) \quad (15)$$

in which P is the pseudorange measurement. Accordingly, generalizing Equation (15) for all of the pseudoranges, letting $R_{ij}$ represent the range between satellite i and monitoring station j, and $P_{ij}$ equaling the pseudorange between the satellite i and the monitoring station j, Equation (15) become $$R_{ij} = P_{ij} + C(\Delta T_{mj} - \Delta T_{si}) \quad (16)$$

in which $\Delta T_{mj}$ is the time correction value for monitoring station j and $\Delta T_{si}$ is the time correction value for the satellite i. Thus, if there are M satellites and N monitoring stations, there are MN equations (16). There are accurate estimated values for the ranges $R_{ij}$ determined from the estimated satellite positions and known monitoring station positions, and the pseudo measurements $P_{ij}$ are known. The time correction values $\Delta T_{si}$ and $\Delta T_{mj}$ are unknowns to be determined and there are M+N of these unknowns. Thus, with five satellites and five ground stations, there are 25 equations (16) and 10 unknown time correction values to be determined. The time correction values are determined using the Equations (16) as a model to determine the unknowns by nonlinear least squares to thus determine by statistics the time correction values which make the closest fit to the 25 Equations (16). In the preferred embodiment, each monitoring station transmits the received satellite messages and the time of receipt of the satellite messages to the central processing facility 15, which carries out the nonlinear least squares calculations of the time correction values once per second. The satellite time correction values are then transmitted to the corresponding satellites by either the central processing facility or by one of the monitoring stations. The satellite time correction value then becomes the correction message or part of the correction message transmitted by the satellite to user stations and to the monitoring stations with the transmitted time message. The appendix attached hereto is a source code listing in APL, which program carries out the nonlinear least squares determination of the time correction values for the satellite clocks and monitoring station clock. In the least squares process, the corrections for the unknowns are iteratively recalculated and added to the unknowns to obtain new unknown values until the calculated correction values stop decreasing or drop below a minimum value.

The satellite time correction values $\Delta T_{si}$ and monitoring station time correction values $\Delta T_{mj}$ are analogous to clock biases, but they are not pure clock biases because they incorporate corrections for other errors in global positioning systems including satellite position errors, tropospheric and ionospheric errors, monitoring station position errors, and satellite accessability errors.

The satellite time correction values determined by the clocks only model as described above become the correction messages transmitted to user stations, where the satellite time correction values are used by the user to correct the satellite transmission times. The user then determines the ranges between the user station and the satellites. From the estimated satellite positions and the ranges between the satellite and user station determined in this manner, the user determines his position in the conventional manner. The software program attached hereto as an appendix also includes the program for the user station to determine the user station position.

As explained above, the mean square modeled measurement state estimation error is $$\frac{N_x}{N_y}(\overline{\eta^2} + \overline{\mu^2}) \tag{17}$$

With N satellites, M monitoring stations, then in the only clocks model as described above for M+N clock states, $$N_x = M+N \tag{18}$$

and with MN measurements $$N_y = MN \tag{19}$$

The above measurement state error of expression may, therefore, be apportioned with the SV clock mean square estimation proportional to 1/M and the station clock mean square estimation error proportional to 1/N. The satellite clock estimation error is then $$\frac{\frac{1}{M}}{\frac{1}{N}+\frac{1}{M}} \cdot \frac{N_x}{N_y}(\overline{\eta^2}+\overline{\mu^2}) = \frac{1}{M}(\overline{\eta^2}+\overline{\mu^2}) \tag{20}$$

The total user mean square range error is, therefore, $$\frac{1}{M}(\overline{\eta^2}+\overline{\mu^2})+\overline{\rho_{SA}^2}+\overline{\eta_U^2}+\overline{\mu_U^2} \tag{21}$$

where $\eta$ is station measurement error, $\eta_U$ is user measurement error, $\mu$ is system monitoring error, $\mu_u$ is user modeling error and $\rho_{SA}$ is satellite accessability error.

With the method described above, the system can detect the position of a user station with a surprising degree of accuracy. Specifically, the user position can be detected with an accuracy of less than three meters. This accuracy is surprising in view of the fact that the only measurements made are the pseudorange measurements and the correction message is determined from a clocks only model. When the error message is expanded to indicate corrections for troposphere and ionosphere, no significant performance improvement results. Thus, the system provides accurate measurements even when no data is inputted to account for other global positioning system errors.

In the above preferred embodiment, the closest fit of the pseudorange measurements to the clocks only model is determined by nonlinear least squares which is believed to be the most effective method of determining the time correction values of the correction message. However, within the scope of the invention, other statistical techniques may be used to determine the closest fit of the pseudoranges in the clocks only model. These and other modifications may be made to the above described invention without departing from the spirit and scope of the invention.

What is claimed is:

1. In a global positioning method of determining the position of a user station from a global positioning system comprising at least four satellites and at least three monitoring stations, said method comprising transmitting time messages from said satellites to said monitoring stations, said time messages indicating the time of transmission of said time messages in accordance with the corresponding satellite clocks, detecting the time of receipt of said time messages by said monitoring stations, said satellites sending said user station a correction message to correct for errors in said global positioning system including clock biases and other global positioning system errors, the position of the user station being determined from the difference between the time of transmission of said time messages and the time of receipt of said time messages and the information in said time correction message, the improvement wherein said correction message comprises satellite transmission time correction values which incorporate said clock biases and corrections for said other global positioning system errors, said correction values being determined from a clocks only model relating the ranges between said satellites and said monitoring stations to measured pseudo ranges between said satellites and said monitoring stations corrected by said satellite transmission time correction values and by monitoring station time correction values, said monitoring station time correction values correcting the time of receipt of said time messages by said monitoring stations in said clocks only model, said satellite transmission time correction values and said monitoring station time correction values being determined statistically in accordance with the closest fit of measured pseudo ranges between satellites and said monitoring stations to said clocks only model.

2. A method as recited in claim 1, wherein said correction time values are determined by nonlinear least squares.

3. A method as recited in claim 1, wherein said correction messages consist of said satellite transmission time correction values.

4. In a method for generating a correction message for a global positioning system in which at least four satellites transmit time messages to at least three ground stations, said time messages containing the time of transmission of said time messages, said correction message containing corrections accounting for errors in said global positioning system including clock biases and other global positioning system errors, the improvement wherein said correction message comprises correction values to be added to or subtracted from said satellite transmission times, said correction values being determined from a clocks only model relating the ranges between said satellites and at least three fixed monitoring stations to pseudoranges between said satellites and said monitoring stations corrected by said satellite time correction values and by monitoring station time correction values representing to corrections in clocks of said monitoring stations, said correction values having been determined statistically in accordance with the closest fit of the measured pseudoranges to said clocks only model.

5. A method as recited in claim 4, wherein said correction time values are determined by nonlinear least squares.

6. A method as recited in claim 4, wherein said correction messages consist of said satellite transmission time correction values.

7. In a global positioning system comprising at least four satellites, each satellite having a satellite clock, and at least three monitoring stations, each monitoring station having a monitoring station clock, said satellites transmitting messages to be received by the user whereby said user station can determine the position of said user station from said satellite messages, said satellite messages including the time of transmission of said messages as indicated by said satellite clocks and a correction message, the improvement wherein said correction message comprises satellite transmission correction values which incorporate clock biases and corrections for other global positioning system errors, said satellite time correction values being determined from a clocks only model relating the ranges between said satellites and said monitoring stations to measured pseudoranges between said satellites and said monitoring stations corrected by said satellite transmission time corrected values and by monitoring station time correction values, said monitoring station time correction values correcting the time of receipt of said satellite messages by said monitoring stations in said clocks only model, said satellite time transmission correction values and said monitoring station time correction values being determined statistically in accordance with the closest fit with the measured pseudoranges between said satellite and said monitoring stations to said clocks only model.

8. A system as recited in claim 7, wherein said time correction values are determined by nonlinear least squares.

9. A system as recited in claim 7, wherein said correction messages consist of said satellite time correction values.

* * * * *